United States Patent
Sparrow et al.

(10) Patent No.: US 7,081,846 B1
(45) Date of Patent: Jul. 25, 2006

(54) ECM TECHNIQUES TO COUNTER PULSE COMPRESSION RADAR

(75) Inventors: Mitchell Joseph Sparrow, Wayne, NJ (US); Joseph Cikalo, Nutley, PA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 30 days.

(21) Appl. No.: 10/877,192

(22) Filed: Jun. 25, 2004

(51) Int. Cl.
*G01S 7/38* (2006.01)

(52) U.S. Cl. .......................................... 342/14; 342/15

(58) Field of Classification Search .................... 342/14
See application file for complete search history.

(56) References Cited

U.S. PATENT DOCUMENTS

| | | | | |
|---|---|---|---|---|
| 4,097,865 A | * | 6/1978 | Jones | 327/164 |
| 4,689,622 A | * | 8/1987 | Kuhrdt | 342/14 |
| 4,743,905 A | * | 5/1988 | Wiegand | 342/14 |
| 4,816,832 A | * | 3/1989 | Gold et al. | 342/14 |
| 4,885,587 A | * | 12/1989 | Wiegand et al. | 342/14 |
| 4,891,646 A | * | 1/1990 | Wiegand | 342/15 |
| 6,429,800 B1 | * | 8/2002 | Richmond | 342/14 |
| 6,608,587 B1 | * | 8/2003 | Sparrow et al. | 342/188 |

* cited by examiner

*Primary Examiner*—Thomas H. Tarcza
*Assistant Examiner*—Matthew Barker
(74) *Attorney, Agent, or Firm*—RatnerPrestia

(57) ABSTRACT

A system and method for generating a counter-measure signal in response to an incoming radar signal from a remote linear frequency modulated (LFM) pulse compression radar system. One method comprises the steps of receiving an incoming radar signal having a time period T; storing at least a portion of the radar signal in a memory; extracting predetermined segments of the radar signal from the memory; replicating the predetermined segments to create a predetermined plurality of each of the predetermined segments; concatenating the plurality of predetermined segments into a further signal, like ones of the plurality of predetermined segments adjacent one another; and transmitting the further signal to the remote radar system.

7 Claims, 7 Drawing Sheets

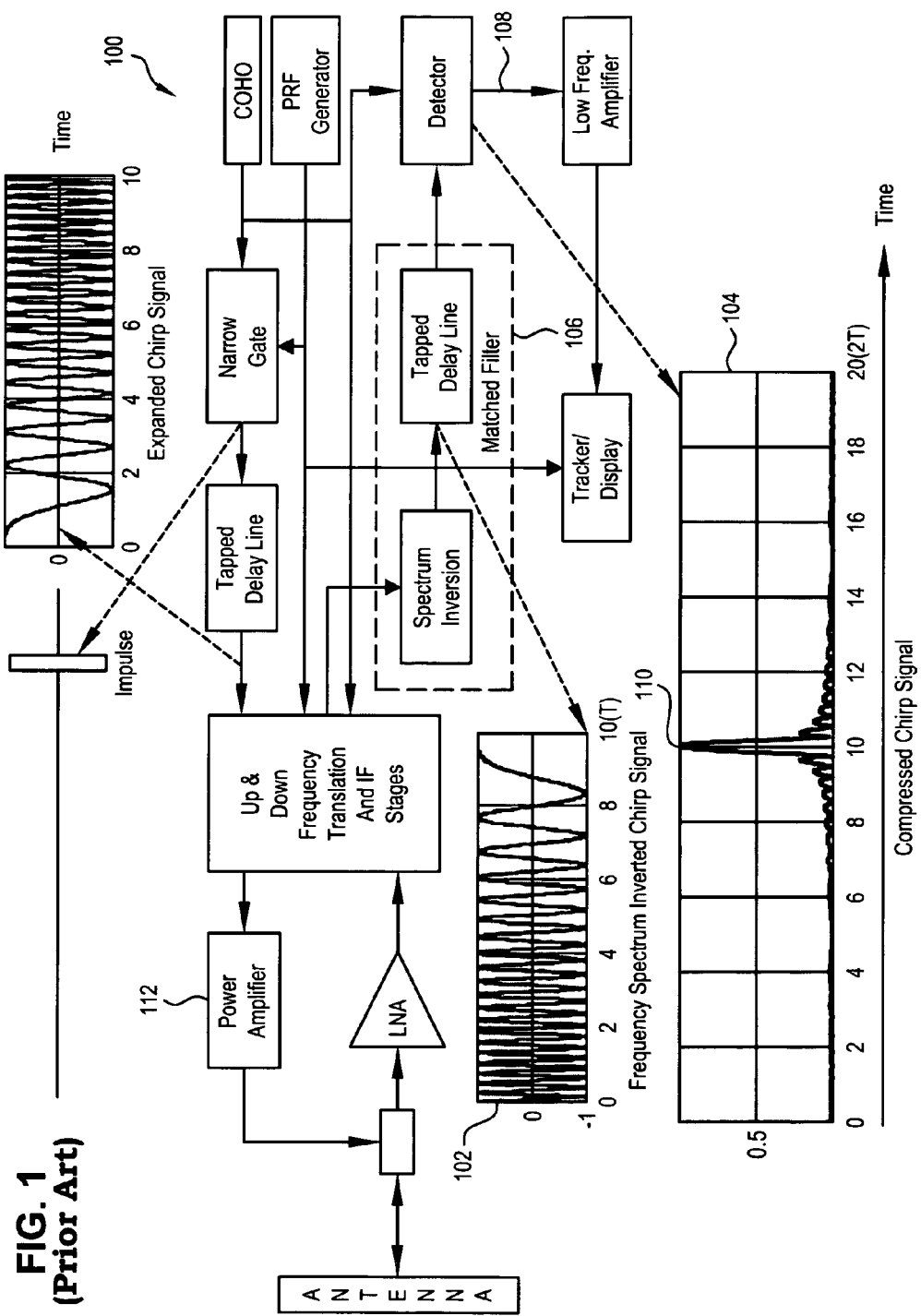

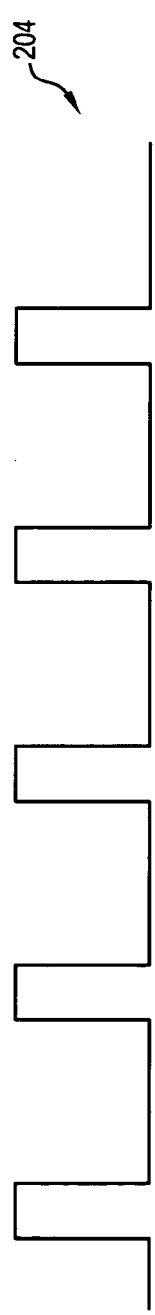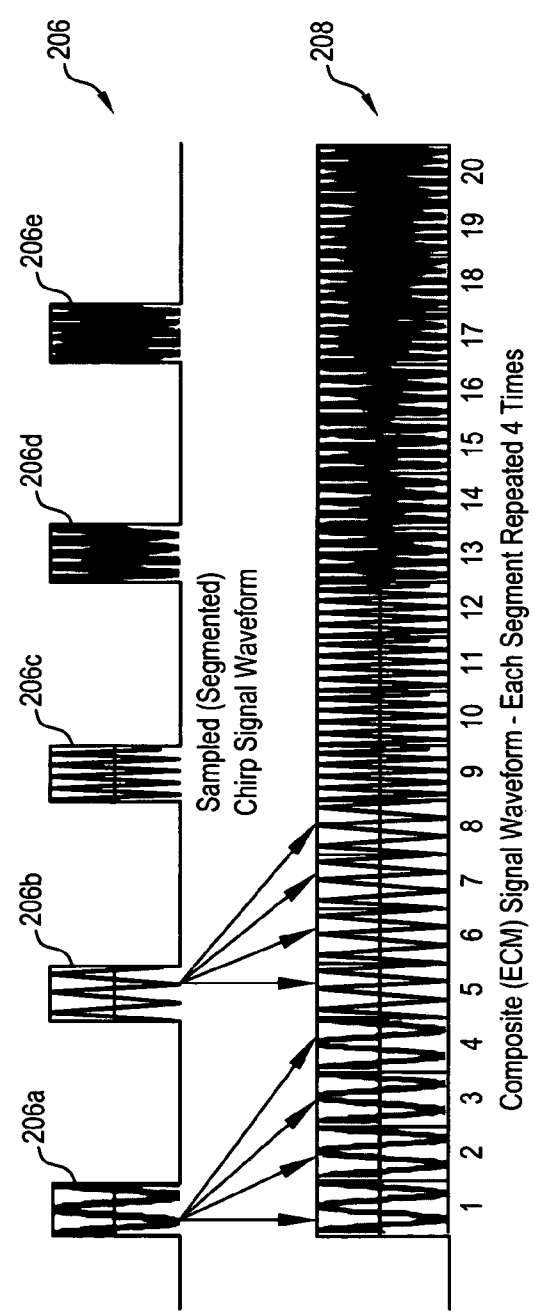
FIG. 2A
FIG. 2B
FIG. 2C
FIG. 2D

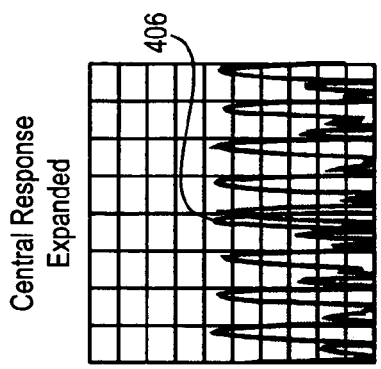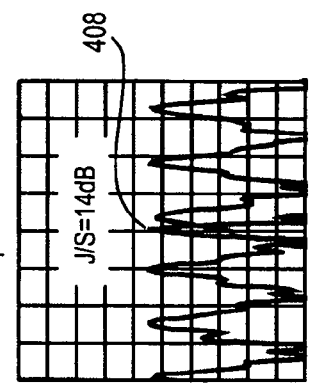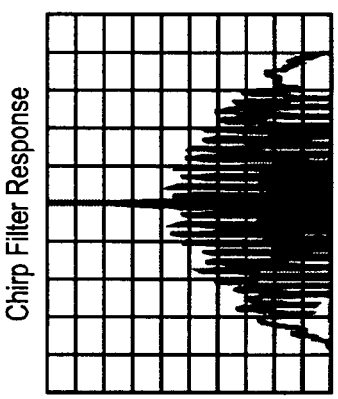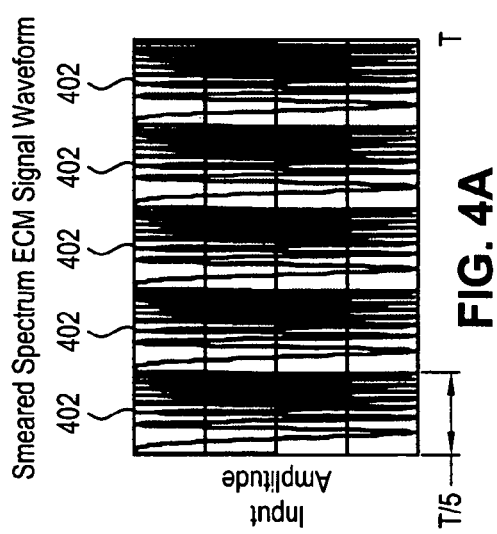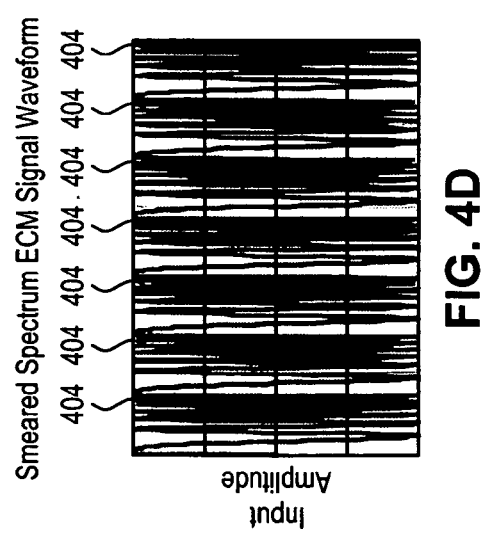

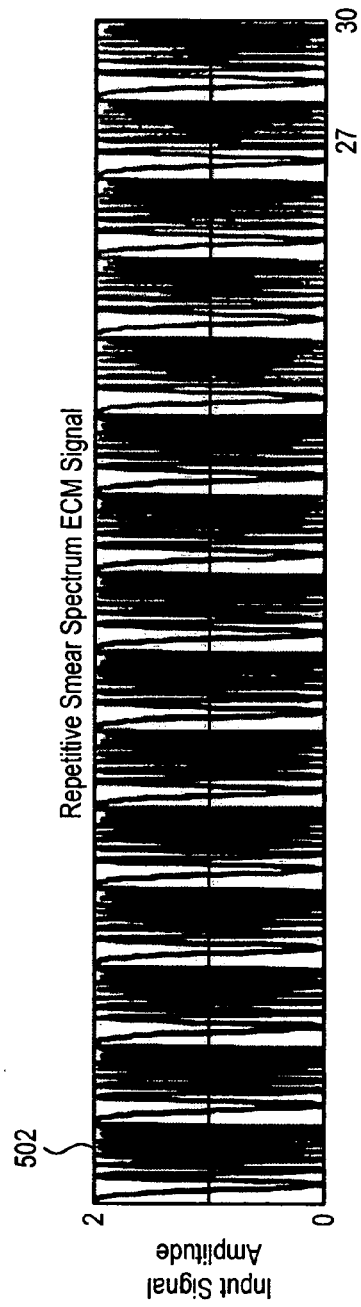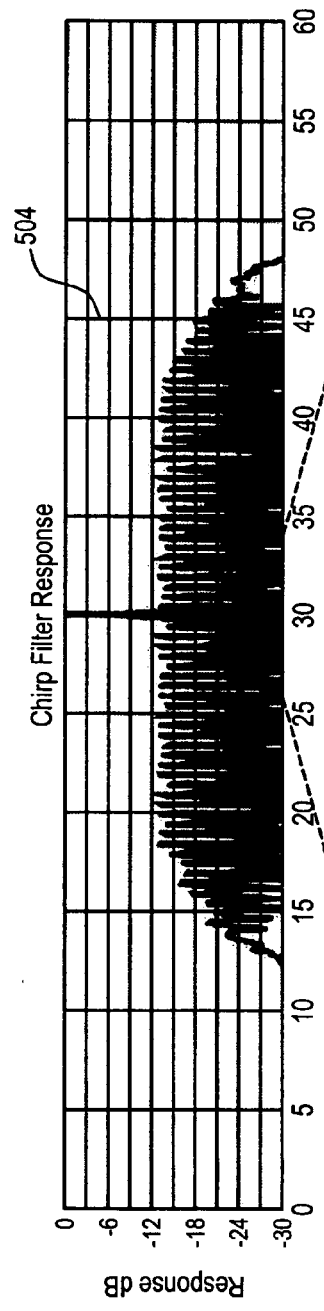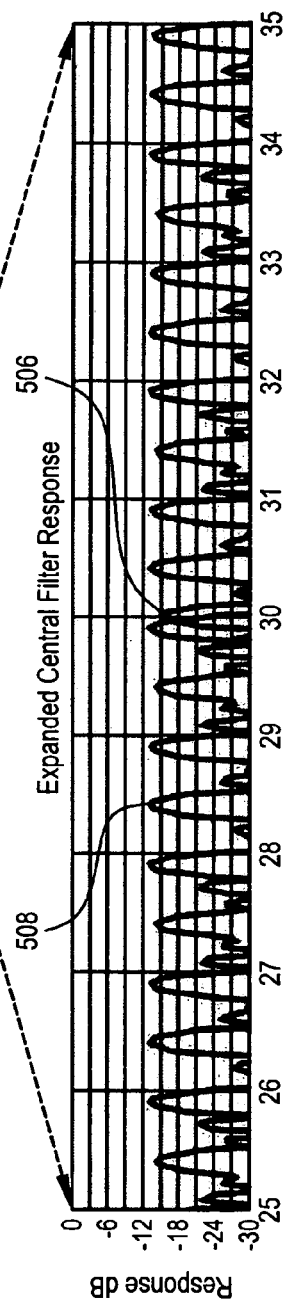

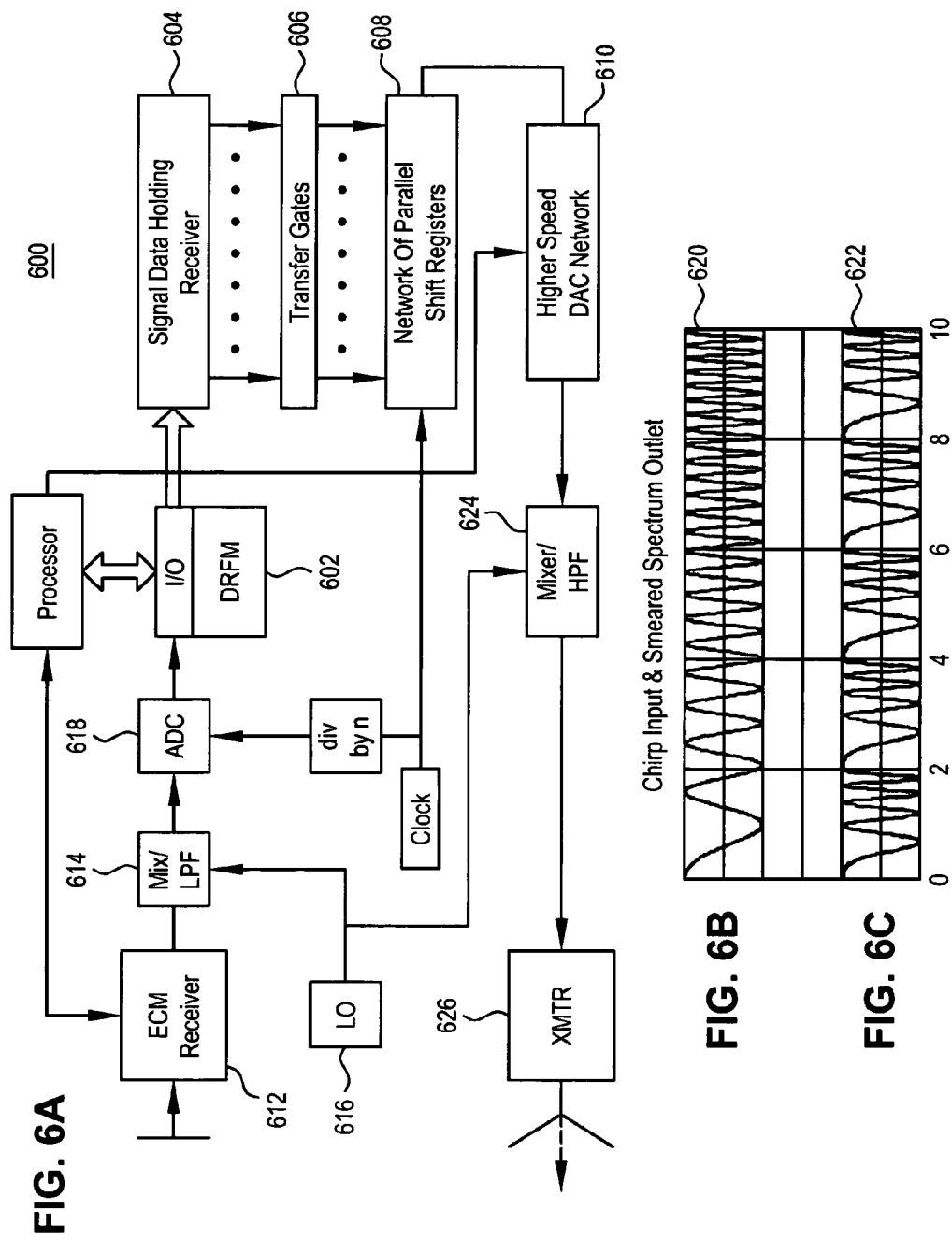

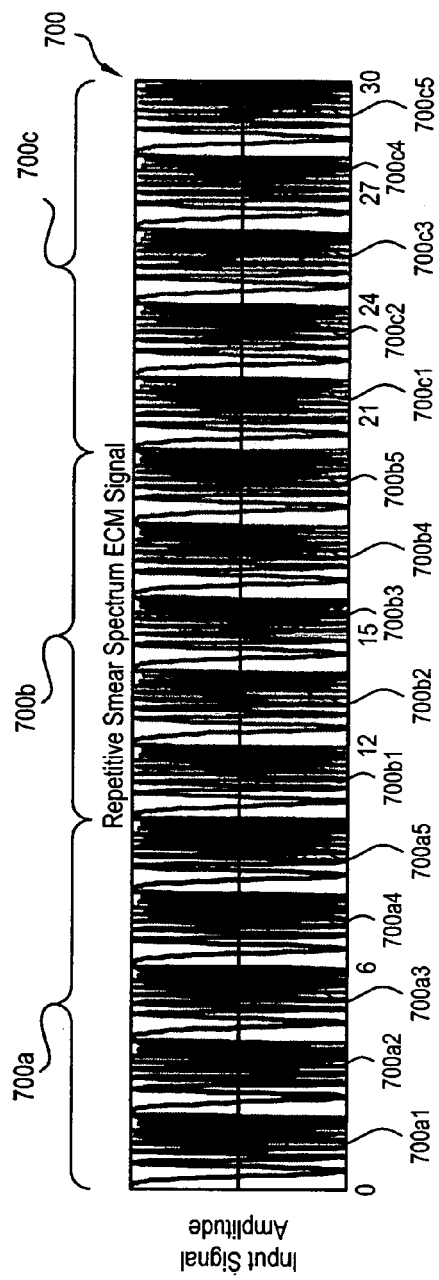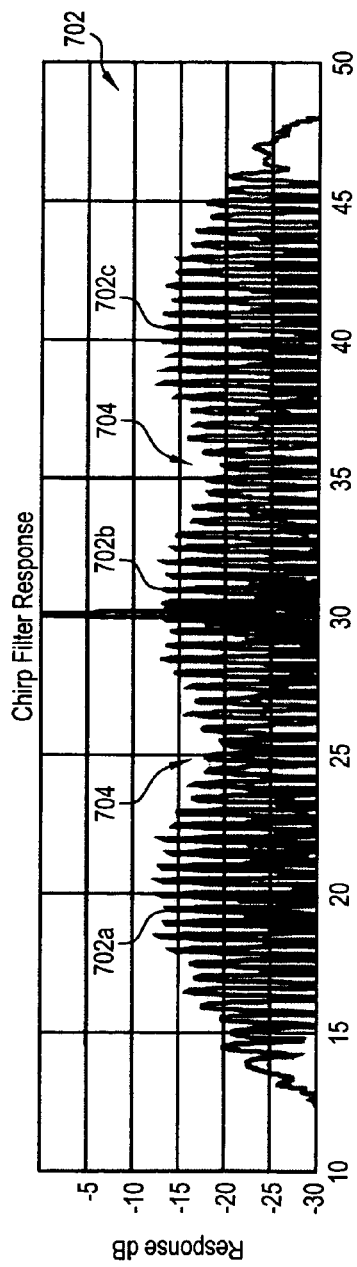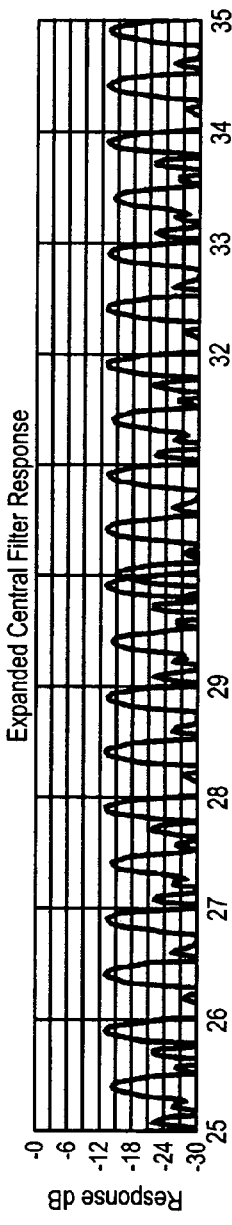
FIG. 7A
FIG. 7B
FIG. 7C

ECM TECHNIQUES TO COUNTER PULSE COMPRESSION RADAR

FIELD OF THE INVENTION

The present invention relates to Electronics Warfare (EW) Systems. More specifically, the present invention relates to signal modulation techniques for use in Electronic Countermeasure (ECM) systems for countering pulse compression radars.

BACKGROUND OF THE INVENTION

A radar is an electronic system that is designed to detect a target and measure the range, angle, and velocity of the target. It performs these functions by transmitting RF signal pulses through an antenna that focuses the energy into a narrow beam to illuminate the target. Range is calculated by measuring the elapsed time between the transmitted pulse and the target echo detected by the radar receiver.

In a conventional Pulsed Doppler (PD) type radar, for example, the target radial velocity component is calculated from measurements of the difference frequency between the transmitted signal and its echo.

Aircraft may be equipped with devices used to transmit RF ECM signals for the purpose of corrupting the target information produced by the defensive radar. Against vintage radar design, such ECM devices have generally been effective because the radar transmits short time duration (typically <1 µsec.) signals. For each radar pulse, the ECM device can transmit almost an unlimited number of signal pulses. In the presence of a large number of ECM pulses a pulse tracker performing range tracking functions becomes overloaded with many ECM pulses that look like target echoes, thus rendering the radar system ineffective.

ECM techniques to counter pulse compression (PC) radar systems are more complex because a PC radar transmits long duration pulses. In the PC radar receiver, the target echo is compressed to a narrow spike. The range tracker receives a narrow lobe comparable to a high peak power pulse. The ECM device cannot physically produce "n" signal pulses for each pulse received from the radar, especially when several PC radars are to be countered.

Spread Spectrum (SPSP) radars are practically immune to conventional range and velocity deception techniques that are based on repeating radar signals. Within the class of PC radars there is a sub-set of radar systems that employ a linear frequency modulated (LFM) signal, often called 'Chirp'.

Driven primarily by limitations on the manufacturing ability to produce greater and greater peak power transmitters for radars to operate over long ranges, pulse compression signal processing techniques were incorporated in a few target tracking radars in the early 1960's. With the advances made in hardware technology, long range low peak power spread spectrum radars began to appear thereafter and the number of such radar systems is steadily increasing. The spread spectrum signals used in long range surveillance radars are predominantly LFM PC signals. The PC signal waveform is characterized by a time bandwidth product (TB>>than 1), or pulse compression, that is typically several hundred.

There are good reasons for using LFM signals with low compression ratios. To maintain a high probability of target detection and low false alarm rate, a large signal to noise power ratio must be maintained. The receiver noise bandwidth of the most common long range radar is on the order of 10 MHz. There are limitations on the signal time duration. The radar receiver must be blanked for the emission duration of the transmitter high power signal. If the transmitted signal envelope time duration is T, the Matched Filter (MF) response extends over 2T. For a target at a range time T/2, the radar receiver produces output (MF) at the end of 3T past the main long pulse. The radar transmitter must be put in a standby mode for 2T past the trailing edge of the emitted PC waveform. Also, the magnitude of the LFM signal compression attribute is not arbitrarily chosen. Rather, it must satisfy the requirements of the signal to noise power radio (S/N), which decreases with increased receiver (compression) filter bandwidth.

The well-known range, velocity, and angle deception ECM techniques that were developed to counter the vintage radar designs are considered to be just as effective when applied to PC radars. The signals that are employed in these techniques, however, are vastly different. In deception of PC radars, the characteristics of the radar signal waveform have to be altered, in addition to the amplitude modulation, time delay, and pulse to pulse RF phase shifts that are fundamental in all electronic deception techniques.

LFM Signal Properties

A PC radar functions just like a traditionally designed radar of the same class. The only difference is in the signal waveform designed for transmission and the processing performed in the radar receiver on the signal returned by the target radar cross section. The signal emitted by a PC radar has low peak power, long time duration, and linear frequency modulated (LFM) over the radar receiver operational frequency band. The radar antenna directs the transmitted signal toward an airborne target (airborne moving platform), and a small fraction of the energy is reflected by the target back to the radar antenna and its output signal is guided to the radar's receiver for processing. The transmitted signal is frequency modulated by a linear function that is typically many microseconds long. In the receiver, the target return signal is compressed by a matched filter process. The filter output is defined by the signal auto-correlation characterized by one narrow central lobe and many low level secondary lobes. The central lobe is $1/\Delta f$ wide at the 50% (3 dB) power points, where $\Delta f$ is the frequency modulation bandwidth. The power of the returned signal is distributed over a time span equal to two times the transmitted signal duration (2T), with 50% of its power confined to the spike region $1/\Delta f$.

An elementary block diagram of a basic PC radar system 100 is presented in FIG. 1. Clearly indicated is the long time duration frequency modulated pulse 102 and its compressed version 104 appearing as the matched filter 106 response that constitutes the receiver output 108. The filter response is represented by a narrow spike 110 located at the center of the output. Whereas the LFM signal time duration is T (10 in this example), the matched filter output is distributed over 2T time duration (20 in this example). It should be clearly noted that, while the filter response is being formed, the transmitter 112 is kept from radiating high receiver signals.

SUMMARY OF THE INVENTION

In view of the shortcomings of the prior art the present invention is a system and method for generating a countermeasure signal in response to an incoming radar signal from a remote radar system.

One method comprises the steps of receiving an incoming radar signal having a time period T; storing at least a portion of the radar signal in a memory; extracting predetermined segments of the radar signal from the memory; replicating the predetermined segments to create a predetermined plurality of each of the predetermined segments; concatenating the plurality of predetermined segments into a further signal, like ones of the plurality of predetermined segments adjacent one another; and transmitting the further signal to the remote radar system.

According to another aspect of the present invention the further signal has a time duration equal to that of the incoming radar signal.

According to a further aspect of the present invention, the selected signal segments are picked out from different time slots of the radar signal and have frequencies different from one another.

According to still another aspect of the present invention, at least one Range False Target signal (RFT) is based on the further signal.

According to yet another aspect of the present invention, a plurality of RFTs are spaced closer than the time period T.

According to still a further aspect of the present invention, the RFTs may be arbitrarily positioned within the time period T.

According to yet a further aspect of the present invention, positions of groups of the RFTs are placed ahead and/or behind a target return signal to increase the Jamming to Signal (J/S) power ratio by about 3 dB per each RFT.

Another method aspect of the present invention for generating a linear frequency modulated (LFM) signal with a multi-lobe auto-correlation function in response to an incoming signal from a transmitting system, comprises the step of generating a plurality of signals comprised of at least "n" sub-waveforms each having a predetermined time duration, where "n" is based on an FM modulation rate of the sub-waveform.

According to another aspect of the present invention, the LFM signal has an FM signal rate of xMHz μsec. and the generated ECM signal has an FM signal rate of x*nMHz/μsec.

According to a further aspect of the present invention, the repetition of the sub-waveform by "n" creates grated lobes in the output signal of a compression filter.

Yet another method aspect of the present invention for generating a counter-measure signal in response to an incoming radar signal from a remote radar system, comprises the steps of: receiving the incoming radar signal; storing the radar signal in a memory; retrieving the radar signal from the memory; loading the radar signal into a D/A converter; converting the radar signal from a digital form signal into an analog signal with the D/A converter; transferring the analog signal from the D/A converter to a transmitter; and repeating the loading and converting steps as necessary to produce a ECM signal having "n" sub-waveforms.

According to another aspect of the present invention, the memory is a digital RF memory (DRFM).

According to a further aspect of the present invention, the method also comprises the steps of: downloading the radar signal from the DRFM into at least one buffer register; transferring in parallel the radar signal from the at least one buffer register into a shift register; and serially unloading the radar signal from the shift register into the D/A converter, wherein a transfer rate of the radar signal from the shift register is a multiple "n" of a transfer rate of the radar signal into the memory.

A system aspect of the present invention for generating a counter-measure signal in response to an incoming radar signal from a remote radar system comprises: a receiver to receive the incoming radar signal; a memory coupled to the receiver to store the received radar signal; a shift register coupled to an output of the memory to retrieve at least a portion of the stored radar signal; a converter to receive a digital representation of the radar signal from the shift register in a serial fashion "m" times to construct an analog signal containing "m" repetitive portions of the radar signal.

According to another aspect of the present invention, a filter is coupled to the output of the converter to filter the analog signal generated by the converter and a transmitter is coupled to an output of the filter for transmitting the filtered analog signal to the remote radar system as the counter-measure signal.

BRIEF DESCRIPTION OF THE DRAWINGS

The patent or application file contains four drawing sheets executed in color. Copies of this patent or patent application publication with color drawings will be provided by the Office upon request and payment of the necessary fee.

The invention is best understood from the following detailed description when read in connection with the accompanying drawing. It is emphasized that, according to common practice, various features of the drawings are not to scale. On the contrary, the dimensions of various features are arbitrarily expanded or reduced for clarity. Included in the drawings are the following Figures:

FIG. 1 is a block diagram of a conventional pulsed compression (PC) radar system;

FIGS. 2A–2D are illustrations depicting a chopping and interleaving technique according to an exemplary embodiment of the present invention;

FIGS. 4A–4C are illustrations of compressive filter response for a five sweep smeared spread spectrum signal;

FIGS. 4D–4F are illustrations of compressive filter response for a seven sweep smeared spread spectrum signal;

FIGS. 5A–5C are illustrations of compressive filter response for a 15 sweep smeared spread spectrum signal;

FIG. 6A is a block diagram of a smeared spread spectrum ECM signal generator according to an exemplary embodiment of the present invention;

FIGS. 6B and 6C are illustrations of chirp signal input and smeared spread spectrum output, respectively, for the system of FIG. 6A; and FIGS. 7A–7C are waveforms illustrating the effect of coherence on filter response.

DETAILED DESCRIPTION OF THE INVENTION

Figure 3A:
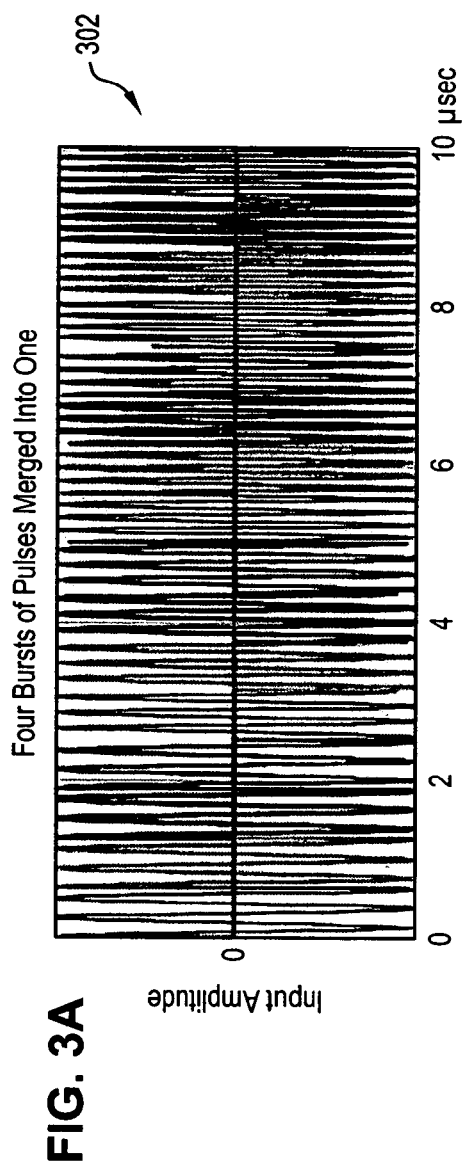
FIGS. 3A–3B are illustrations depicting a radar's chirp filter response to a chopped/interleaved signal.

The design of an effective ECM technique must be based on PC signal characteristics that are altered. Just repeating the radar transmitted signal, as done in countering conventional pulsed radars, is not effective, because only one range false target is produced. In contrast, by altering the frequency modulation structure of the intercepted signal and returning it to the radar, a multi-lobe filter output is produced. The output can be made to look like a fence with protruding spikes, with minimum loss of signal power. If a LFM signal and wide bandwidth noise of equal power are applied to the matched filter, the matched filter output power is increased by a factor equal to the compression factor (PC), where PC=T/(1/Δf)=TB, (defined by division of the pulse length at the filter input by the separation distance of 3 dB power points of the filter output). The noise signal power is increased only by $PC^{1/2}$. Thus, in order to produce a multi-lobe filter output, the ECM signal must be frequency modulated. The inventors have found that two frequency modulation techniques have the capability to produce a broad multi-lobe filter output and their descriptions are provided below.

Countering Pulse Compression Radars

LFM PC signals are mostly used in ranging radars that track targets in range. Range tracking is accomplished with a pulse tracker that automatically maintains a time gate on the target returned signal. By the use of ECM signals that produce range false targets, range tracking is readily rendered ineffective by overloading the tracker with a large number of Range False Target (RFT) signals. A conventional pulsed radar is countered in accordance with a sequence of events. A typical chain of events consists of the ECM receiver capturing the radar transmitted pulsed RF signal, storing it in the EW system's Digital Radio Frequency Memory (DRFM) device, and downloading the memory contents to generate ECM signals. Any number of RFTs are generated by downloading the stored radar signal once for each RFT. Because the pulses are of short time duration ($\Delta t<1.0$ μsec.), closely spaced RFTs are readily produced. Any ECM signal technique intended to counter a PC radar must produce RFT signals spaced much closer than the LFM signal time duration, T, because it is generally much longer than 1 μsec.

As was already shown by the illustrations in FIG. 1, the matched filter output 104 (the signal auto-correlation function) main lobe 110 width is dependent on the signal bandwidth. Thus, the compression filter output can be shaped by manipulation of the ECM signal frequency modulation function. To assure that the RFTs look like a reflected signal of a target, the ECM signal frequency modulation must sweep over the entire PC signal frequency bandwidth.

To generate effective ECM signals that produce a multi-lobe filter output, two modulation approaches are presented and described. The two approaches are:

1. Chopping and Interleaving and
2. Smeared Spectrum

Both approaches require storing the PC signal in memory. For example, a well-known DRFM device can be used to store the captured radar PC signal. Therefore, the conceptual ECM signal design will assume the availability and use of a memory device, such as a DRFM.

I. Chopping and Interleaving

The first exemplary approach is a chop and interleave technique which consists of a process that picks out uniformly spaced sampled signal segments of the radar PC signal that has been stored in a DRFM. The sampling process is graphically demonstrated by the illustrations shown in FIGS. 2A–2D.

As shown in FIG. 2A, the exemplary LFM signal envelope 202 is 10 units long (T). As shown in FIG. 2B, the time gate that pulls out selected segments of the signal is shown by a burst of 5 pulses 204. As shown in FIG. 2C, the selected signal segments 206a–206e are at different time slots and frequencies. As an example, the selected segments are 1, 5, 9, 13, and 17. An ECM signal 208 is created by placing (concatenating) the segments in the adjacent vacant slots. Segment 1 occupies its own slot 1 and then is loaded in slots 2, 3, and 4. Segment 5 occupies slot 5 and is inserted into slots 6, 7 and 8, etc. The assembled waveform 208 is illustrated in FIG. 2D and contains 20 samples of the LFM signal and is of the same length (T), as the LFM signal 202 shown in FIG. 2A.

When ECM signal 208 is received by the radar receiver, it is processed by a compression filter that is matched to the radar LFM signal. In the filter, the composite waveform is recognized as four separate bursts of 5 coherent signal pulses. The filter response is derived via computation of the cross-correlation operation of the input signal with the filter transfer function.

To counter a PC radar, the exemplary EW system uses techniques that are based on the transmitted radar waveform. The countermeasures action commences and follows a sequence of events analogous to countering a radar of conventional design. The ECM receiver processor locates the radar pulse in a frequency band, assigns a pulse tracker to it, and guides the radar signal to a DRFM device for storage. A technique is assigned, which instructs the DRFM device to output the selected samples of the stored waveform each time when there is a demand for false targets.

The retrieval times instructions are generated by the ECM technique which employs a pulse tracker synchronized to the target tracker so that the false targets are coordinated and synched to the target return signals. A transmitted pulse can be coincident with the target return, leading or trailing it by many range bins. If in the engagement a pulse Doppler radar is involved, the pulses are phase shifted as they emerge from the memory storage device. Further, the phase shifts give the signal a Doppler frequency attribute. Time delays and phase shifts that are imparted to the transmitted signals do not alter the pulse frequency spectrum. The chopping/interleaving generated ECM signals produce a multitude of bunched lobes in the filter output. To be effective versus a PC ranging radar, the deception technique desirably uses RFTs that are spaced closer than the radar signal time duration T. The exemplary chopping and interleaving technique provides a means for positioning the RFTs almost anywhere within the time span T.

According to well-known sampling theory (Shannon), any signal is uniquely defined by 2TB samples, where B is the signal bandwidth and T is the signal time duration. An LFM signal represented by 2TB samples has a 'single' lobe auto-correlation function. An ECM signal created from 2TB samples would induce a maximum amplitude single lobe filter response, which would amount to one RFT. On the other hand, by transmitting an ECM signal comprised of a smaller number of samples, a multi-lobe filter response is induced. Depending on the number of samples and spacing among them, 3 to 5 major lobes can be created in the filter output, with each lobe acting as an RFT. This is illustrated in FIGS. 3A–3B.

Figure 3B:
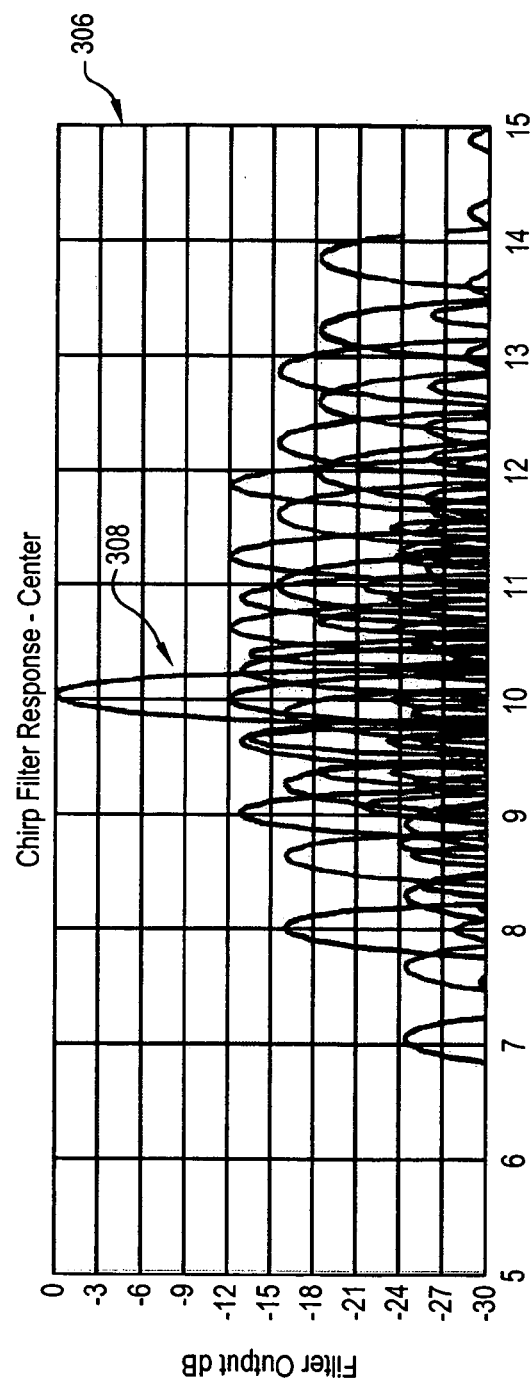

As shown in FIG. 3A, an exemplary waveform 302 is comprised of 16 samples of a LFM signal that is 10 μsec. long with a compression ratio of 100. In this example, and as shown in FIG. 3B, the filter output 306 is in the 20 logarithmic (dB) scale. For comparison purposes, the matched response 304 is included (a compressed LFM signal in the center). The filter output 306 shows a multi-lobe structure with the significant lobes 308 bunched in the center. Positions of the grouped RFTs are controllable, making it possible to position them ahead or behind the target return. This method of generation of RFTs reduces the Jamming to Signal (J/S) power ratio by 3 dB per RFT, because each burst of pulses contains only 25% of the signal power. Further, the reduction of the J/S ratio is independent of the pulse compression (PC) number, based on equal RF signal power being available over the LFM signal frequency band. Furthermore, the components of the ECM signal are segments of the LFM signal to which the filter transfer function is matched. Consequently, the composite signal compresses just as well as the LFM signal.

II. Smeared Spectrum

The exemplary smeared spectrum modulation technique produces a linear frequency modulated signal with a multi-lobe auto-correlation function. When the smeared spectrum frequency modulated signal is applied to the compressive filter, the filter response amplitude looks like a comb structure (uniformly distributed spikes). Each spike has a spectrum density distribution that practically is indistinguishable from the compressed LFM signal.

This modulation technique is a more flexible method for generation of frequency modulated ECM signals that also produces RFTs with different properties. One attribute is the larger number of false targets, which is more effective in the case where the radar serves as a surveillance function (track while scan (TWS)). It is highly desirable to produce a large number of RFTs to mask or hide the target return. An effective ECM technique should desirably fill up large blocks of range bins surrounding the bin which contains the target. The chopping and interleaving signal technique produces a number of RFTs that may be too small to be effective against all radar types. A much larger number of distributed RFTs is produced by a frequency modulation technique termed by the inventors as the Smeared Spectrum (SMSP) technique.

Smeared Spectrum Signal Development

An exemplary SMSP technique involves a process that generates ECM signals comprised of short time duration sub-waveforms, made of one sub-waveform repeated at least "n" times, where the value of "n" is related to the FM modulation rate of the sub-waveform. For example, if the LFM signal FM rate is kMHz(t/T), the sub-waveform FM rate is kMHzt/(T/n). For an ECM signal of time duration T, the LFM frequency band is swept "n" times (2<n<10). Quantitavely, if the LFM signal FM rate is 1.0 MHz/μsec. the ECM signal FM rate is raised to 1.0*nMHz/μsec. The repetitive frequency sweep greatly expands the central lobe of the compression filter output. Because the signal is deliberately mismatched, the J/S reduction is worse than in the case of the previously cited chopping and interleaving technique of 3 dB per a group of RFTs.

An SMSP signal is developed from the PC radar signal that has been stored in a DRFM device. An exemplary method of the present invention increases the FM rate. The way the ECM signal is generated is described as follows (referring to FIG. 6). In preparation for transmission of ECM signals, the radar signal data stored in DRFM 602 is downloaded to a holding buffer register 604. Then, in parallel, the data is transferred to a bank of shift registers 608 which are connected in parallel. From this bank of shift registers 608, data is serially unloaded to a digital to analog (D/A) conversion network 610. The data is transferred at a clock frequency that is "n" multiples of the clock which was used to load the radar signal into the DRFM 602. The data transfer is repeated as many times as required to produce an ECM signal consisting of "n" sub-waveforms. For example, to raise the FM rate to 5 times that of the LFM radar signal, the contents of the bank shift registers 608 are pushed out in T/5 sec. The unloading is repeated 5 times to produce an ECM signal T sec. long. A case in which the shift register is unloaded 5 and then 7 times in T seconds is illustrated in FIGS. 4A–4C and 4D–4F, respectively. On the left side of FIG. 4 are the two ECM signal waveforms. The top waveform (FIG. 4A) is frequency modulated at 5 times the FM rate, containing 5 packets of signals 402 (one signal packet repeated 5 times), each T/5 long. The created waveform time duration T is made equal to the radar signal. The bottom waveform (FIG. 4D) represents a signal that is of the same length but contains 7 identical packets 404 at 7 times the FM rate. The signals are processed by the compression filter and the resultant responses in logarithmic (dB) form are shown as FIGS. 4B and 4E, respectively. On the right side of FIG. 4 (FIG. 4C related to FIGS. 4A and 4B, and FIG. 4F related to FIGS. 4D and 4E) are central lobes 406, 408 of the responses graphed on expanded scales. As illustrated in FIGS. 4C and 4F, the respective J/S power ratios are reduced by at least 15 dB. By increasing the input J/S power ratio by 18 dB, the ECM induced filter output would completely swamp the target return signal.

For deception of surveillance PC radars, that also function as TWS, the ECM signals should desirably produce a large number of RFTs in order to be effective. It is very difficult and impractical to produce ECM signals that would induce compressive filter response comprised of distinct RFTs. But ECM signals that induce a multi-lobe filter output are readily generated by the exemplary smeared spectrum frequency modulation. The filter output can be extended in time much longer than T. This is accomplished by commencing transmission of ECM signals before the radar signal arrives at the ECM receiver antenna and continuing transmission past the time when it is reflected by the target radar cross section (RCS). There is no apparent need to synchronize the transmitted ECM signals to the target returned signal. If the transmission begins at a time longer than T ahead of the echo pulse and is continued behind it, the target returned signal becomes obscured by a long string of lobes (spikes) in the filter output. This effect is validated by the illustrations presented in FIGS. 5A–5C. FIG. 5A is a composite waveform consisting of 15 identical packets 502 of a signal with a frequency modulation rate that is 5 times greater than the FM rate of the radar LFM signal. The transmission time is extended over a time span that is 3 times (3T) that of the radar signal. For the purpose of validation, the signal transmission was started T sec. ahead of the radar pulse and continued T sec. past it. FIG. 5B illustrates the compression filter output 504 distributed over the cross-correlation interval of 5T. FIG. 5C illustrates the central section of the filter response plotted on the expanded scale, and the J/S power ratio was raised by 15 dB. It can be readily demonstrated that for an available J/S ratio of 18 dB and larger, the target RCS returned pulse 506 is completely masked by the broadly distributed lobes 508 of the ECM induced filter output.

As shown in FIG. 5C, the 3T long ECM waveform induced filter output, consisting of uniformly distributed of almost equal amplitude lobes, extends over 48% of the central region and is down by about 12 dB. Filter responses induced by ECM signals with the FM rate varied from 2 to 10 times that of the LFM radar signal were examined. The results revealed that the least J/S degradation is encountered with signals that are frequency modulated at rates 5 to 7 times greater than the radar LFM signal. The design of an optimum ECM signal must also include the LFM signal pulse compression number. So far, the results indicate the necessity for tailoring the ECM signal modulation characteristics to the radar signal.

Application

ECM signals generated by the two exemplary signal frequency modulation techniques are not intended for interchangeable utility. There are boundaries on their effectiveness. The chopping/interleaving technique generated signals are more effective in use against the target tracking type radars and radars with a wide range of PC numbers. The smeared spectrum modulation technique signals are more effective against the surveillance type radars with PC numbers nominally less than 500. Effectiveness of the ECM signals generated by the modulation techniques should be evaluated against each class of PC radars and used accordingly.

Hardware Implementation

Both exemplary signal modulation techniques are desirably implemented with a DRFM stored radar signal. A DRFM device (such as DRFM 602 shown in FIG. 6) is an integral part of any advanced technology EW system. It performs the function of a digital memory for storing analog signals at IF to RF frequencies. In the development of ECM techniques it becomes a source of the radar signal. The smeared spectrum ECM signals are generated in a manner as indicated by the exemplary block diagram in FIG. 6. A PC signal transmitted by a selected radar is received by receiver 612, translated down in frequency to a base band (IF=0) by local oscillator 616 and mixer/LPF 614, processed (digitized) by ADC 618, and stored in DRFM 602. Normally, a pulse tracker is assigned to track the radar signal and predict its next time of arrival. Also, the tracker provides the information needed to initiate transmission of ECM signals. A timing signal developed with the tracker information is used to command DRFM 602 to download the stored signal data.

Downloading is in accordance with a prescribed procedure. The stored signal is a sampled version of the LFM signal represented by 2TB data points. For example, a LFM signal 10 µsec. long with a 10 MHz bandwidth is sampled with a 20 MHz (Nyquist frequency) clock, and the 200 collected digital data points are stored in memory. The samples are spaced 50 µsec. apart. To restore the signal to its original analog form, data points are unloaded to the D/A network at 50 nsec. time intervals. A smeared spectrum signal is generated by unloading the data points at a rate that is "n" times greater. The point is made clear by the use of the same example. To generate a smeared spectrum signal with an FM rate of 5 MHz/µsec. the data points are downloaded at 10 nsec. time intervals.

Referring again to FIG. 6, the downloading task is accomplished in two steps. Referring now to FIG. 6, in the first step, the data is transferred from DRFM storage 602 to buffer holding register 604. In the second step, data from buffer register 604 is transferred in parallel via transfer gates 606 to a bank of shift registers 608 connected in parallel. To begin transmission of ECM signals, bits of data are simultaneously unloaded out of shift registers 608 at a higher clock frequency into Digital to Analog Converter (DAC) 610. The bank of shift registers 608 is loaded at T/n rate and serially unloaded in T/n time. In the cited example, n=5, and T/n=2 µsec. Data is clocked out of shift registers 608 and into DAC 610 at a rate that is a multiple of the clock frequency used in loading the data into DRFM storage 602. Complete data sets are clocked out as many times as needed to produce an ECM signal waveform consisting of "m" number of repeated time compressed "LFM" signal packets. It should be noted that, if the ECM signal time duration is equal to the radar pulse, then m>n. The output of DAC 610 is provided to Mixer/High Pass Filter (HPF) 624, which is in turn coupled to both Local Oscillator 616 and transmitter 626. FIGS. 6B and 6C illustrate chirp input signal 620 and smeared spectrum output signal 622, respectively.

Coherence

The smeared spectrum ECM signals induce broadly distributed lobes in the matched filter output when the sub-waveforms are phase coherent. Any two adjacent sub-waveforms produce some lobes that overlap. If the sub-signals are not phase coherent, the overlapping lobes can combine destructively. The impact of coherence is demonstrated by illustrations shown in FIGS. 7A–C. FIG. 7A illustrates an ECM signal 700 comprised of 3 identical waveforms 700a, 700b, 700c. Each waveform 700a, 700b, 700c contains 5 sub-waveforms 700a1–700a5, 700b1–700b5, 700c1–700c5 that are coherent. The filter response is computed for individual waveforms. The 3 responses are superimposed into waveform 702 as shown by the illustration in FIG. 7B. The overlapping portions of the responses are clearly visible. The filter output does not appear as a string of equal magnitude spikes, but contains humps 702a, 702b, 702c. The humps result from the presence of IF frequency phase discontinuities occurring at the junctions 704 between two waveforms. The disruption of coherence is eliminated by a process that translates the LFM radar signal frequency to 0 (zero) IF. Furthermore, the presence of IF frequency is to be avoided because it decreases the J/S power ratio and alters the shape of the filter output. FIG. 7C illustrates the central section of the filter response 702 plotted on an expanded scale.

Although the present invention is intended for use in aircraft defensive systems, it has a broader application. For example, the signal time compression technique is equally useful where there is a need to reduce the time taken to perform signal analyses. The exemplary frequency modulation method can become fundamental to the development Electronic Countermeasures (ECM) techniques to counter the Pulse Compression (PC) class of radars. To counter the pulse compression radars, Electronics Warfare (EW) systems need efficient modulation schemes to generate signals to realize effective ECM techniques. With sufficient radio frequency (RF) signal power, ECM technique signals can be generated with the capability to disrupt the ability of a radar to track aircraft targets.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A method for generating a linear frequency modulated (LFM) signal with a multi-lobe auto-correlation function in response to an incoming signal from a transmitting system, comprising the step of generating an output signal based on a plurality of portions of at least one input signal comprised of at least "n" sub-waveforms each having a predetermined time duration, where "n" is based on an FM modulation rate of said sub-waveform.

2. The method according to claim 1, wherein n is between 2 and 10.

3. The method according to claim 1, wherein said LFM signal has an FM signal rate of xMHz/µsec. and a generated ECM signal based on said LFM signal has an FM signal rate of x*nMHz/µsec.

4. The method according to claim 1, wherein repetition of said sub-waveform by "n" expands a central lobe of an output signal of a compression filter used to process said output signal.

5. A method for generating a counter-measure signal in response to an incoming radar signal from a remote radar system, the method comprising the steps of:
- receiving said incoming radar signal;
- storing said radar signal in a digital RF memory (DRFM);
- downloading said radar signal from the DRFM into at least one buffer register;
- transferring in parallel the radar signal from said at least one buffer register into a shift register;
- serially unloading said radar signal from said shift register into a D/A converter;
- converting said radar signal from a digital signal into an analog signal with said D/A converter;
- transferring said analog signal from said D/A converter to a transmitter; and
- repeating the loading and converting steps as necessary to produce a ECM signal having "m" sub-waveforms,
- wherein a transfer rate of said radar signal from said shift register is a multiple "n" of a transfer rate of said radar signal into said memory.

6. A system for generating a counter-measure signal in response to an incoming radar signal from a remote radar system, the system comprising:
- a receiver to receive said incoming radar signal;
- a memory coupled to said receiver to store said received radar signal;
- a shift register coupled to an output of said memory to retrieve at least a portion of said stored radar signal; and
- a converter to receive a digital representation of at least a portion of said radar signal from said shift register in a serial fashion "m" times to construct an analog signal containing "m" repetitive portions of said received portion of said radar signal.

7. The system according to claim 6, further comprising:
- a filter coupled to an output of said converter to filter said analog signal generated by said converter; and
- a transmitter coupled to an output of said filter for transmitting said filtered analog signal to said remote radar system as said counter-measure signal.

* * * * *